Sept. 16, 1958 W. D. L. THEED 2,851,863
AIR CONDITIONING APPARATUS FOR AIRCRAFT
Filed July 6, 1954
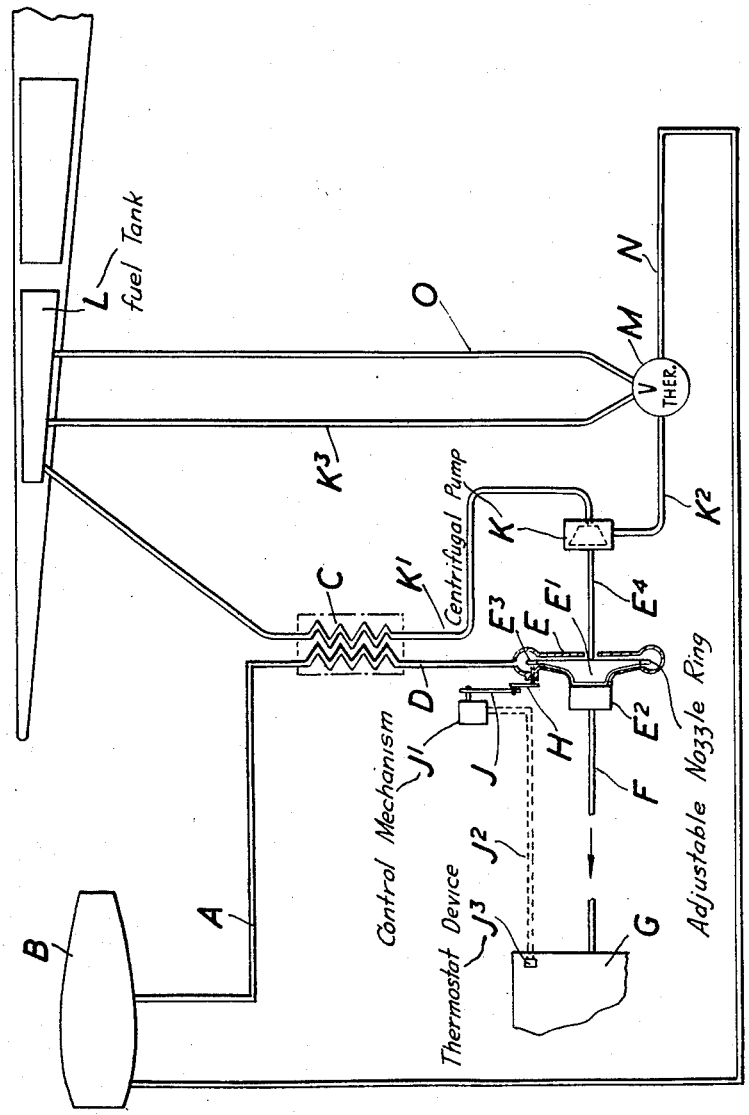
INVENTOR
William D.L. Theed.
BY Watson, Cole, Grindle +
Watson ATTORNEYS

United States Patent Office 2,851,863
Patented Sept. 16, 1958

2,851,863
AIR CONDITIONING APPARATUS FOR AIRCRAFT

William Denis Learoyd Theed, Wargrave, England, assignor to Sir George Godfrey and Partners (Holdings) Limited, Hanworth, England, a British company Application July 6, 1954, Serial No. 441,336

Claims priority, application Great Britain July 7, 1953

5 Claims. (Cl. 62—172)

This invention relates to air conditioning apparatus for aircraft of the kind in which air to be delivered to a cabin or other compartment in which air conditioning is desired is derived from an air compressor or forwardly facing air intake and is then cooled by direct heat exchange and/or by passing it through an air turbine driving some power absorbing device and in which heat from the air is thus converted into mechanical energy, so as to cool the air before delivery to the cabin or compartment in which air conditioning is desired.

In one form of apparatus of the above kind as hitherto proposed the air turbine was arranged to drill a fan which either circulated air over an intercooler or acted as a compressor to increase the pressure of the air supplied to the air turbine.

In air conditioning apparatus of the general kind referred to according to the present invention, means are provided for extracting heat from the air and transferring it in the form of heat and/or mechanical energy to fuel which is to be supplied to an engine constituting a propulsion unit for the aircraft in which the apparatus is installed so as to put heat into the fuel.

Thus in air conditioning apparatus of the general kind referred to according to the present invention the air may be caused to flow through an air-to-fuel heat exchanger in which it gives up heat to the fuel and/or may be caused to drive an air turbine or other expansion engine arranged to drive a liquid pump for circulating fuel to be supplied to the engine constituting a propulsion unit for the air-craft so as both to put heat into the fuel and to circulate it.

Thus in a preferred arrangement according to the invention embodying such a fuel circulating pump driven by a turbine using the air as working fluid, the inlet and outlet of the pump would be so coupled to one or more fuel tanks in the aircraft as to circulate the fuel continuously through such tank or tanks and thus tend to maintain the whole of the fuel in such tank or tanks within a desired temperature range.

Moreover with such an arrangement there would preferably be an air-to-fuel heat exchanger arranged in the air inlet passage to the turbine so as to cause transfer of heat from the air being delivered to the turbine to the fuel being circulated before the air is expanded and thus cooled in the turbine, thus tending still further to heat the fuel and reduce the temperature of the air leaving the turbine.

In any case there may be a thermostatically controlled valve or other means in the fuel circulating system controlling the rate of circulation of the fuel or the delivery of fuel to the engine or engines of the aircraft in such a manner as to tend to maintain the fuel delivered to the engine or engines within a desired temperature range suited to engine requirements. Alternatively or in addition manual or automatic means may be provided for altering the characteristics of the pump so as to vary the value of the temperature drop in the turbine and that of the corresponding temperature rise in the pump or the relationship between these two values.

Moreover, according to a further feature of the invention, the air turbine may be provided with variable delivery nozzle means, as for example by making the vanes constituting the nozzle ring adjustable in known manner so as to enable the speed of the turbine and the transfer of heat energy from the air to the fuel to be controlled.

One typical arrangement according to the invention is shown diagrammatically by way of example in the accompanying drawing.

In the arrangement shown in the drawing the air conditioning apparatus comprises a compressed air supply passage A arranged to receive hot compressed air from a suitable stage in the compressor of a propulsion engine B of the combustion turbine jet propulsion type, the compressed air from the passage A passing through one section of a heat exchanger C and thence through a passage D to a radial flow air turbine E having a rotor $E^1$. The outlet $E^2$ of the turbine E is connected by a passage F to a compartment, indicated at G, in which conditioned air is required and which will normally be a cabin of the aircraft of which the engine B constitutes a propulsion engine. The turbine E is of the kind having an adjustable nozzle ring indicated at $E^3$ by which the air is delivered on to the blades of the rotor $E^1$, this adjustable nozzle ring being adjustable in known manner by means of adjusting mechanism indicated diagrammatically as a lever H controlling the nozzle ring and arranged to be operated by a lever J of control mechanism $J^1$ which is connected through suitable interconnecting means $J^2$ to a thermostatic device $J^3$ in the compartment G so that the setting of the nozzle ring $E^3$ is automatically controlled by the thermostatic device $J^3$ in accordance with the temperature in the compartment G.

The rotor of the turbine E is arranged to drive, through a shaft $E^4$, a centrifugal pump K the inlet of which is connected by a passage $K^1$ to one point in a fuel tank L of the aircraft, through the other section of the heat exchanger C, so that air passing through the passages A and D gives up heat in the heat exchanger C to fuel passing from the tank through the passage $K^1$ to the pump K.

The outlet passage $K^2$ of the pump K is connected to one inlet of a thermostatic mixing valve M one outlet of which is connected to a pipe N by which fuel is delivered to the engine B, while its other outlet is connected to a fuel return pipe $K^3$. The valve M also has a second fuel inlet connected through a pipe O directly to the fuel tank L, the arrangement being such that the valve controls in known manner the proportion of fuel which passes respectively from the pipe $K^2$ and from the pipe O into the pipe N so as to deliver fuel through the pipe N at a predetermined temperature.

In operation it will be apparent that hot compressed air delivered through the passage A is first partially cooled by giving up part of its heat to fuel in the heat exchanger C and then gives up further heat in its passage through the turbine E so that it enters the passage F in a comparatively cool state, the turbine E serving to drive the pump K and thus circulate fuel continuously through the heat exchanger C and the pipe $K^1K^3$ so that heat is transferred to the fuel both in the heat exchanger C and in the form of energy, part of which may be converted into heat, in the pump K. Heated fuel from the circulating system $K^2$, $K^3$, L, C, $K^1$ is delivered with or without an admixture of cooler fuel from the pipe O through the passage N to the engine B. In this connection it will be appreciated that the temperature of the fuel in the pipe $K^2$ will always be substantially above that in the tank L.

During operation in the manner indicated above the thermostatic device $J^3$ will control the setting of the nozzle ring $E^3$ through the device $J^1$ so as to vary the energy absorbed by and hence the degree to which the air is cooled in its passage through the turbine E in such a manner as to tend to maintain a predetermined temperature in the cabin G. Such control of the nozzle ring will, it will be seen, also, by changing the characteristics of the turbine, vary the relationship between the energy in the form of heat lost by the air in its passage through the turbine and the energy transmitted to the fuel by the pump K.

The thermostatic mixing valve M may in addition be arranged so as to throttle the outlet $K^2$ from the pump under some conditions and thus vary the relationship between the heat lost from the air in its passage through the turbine E and the temperature increase imparted to the fuel in its passage through the pump K.

It will be understood that the conditioned air may be led by the pipe F to any desired point, e. g. to a cabin or compartment or to an air conditioned suit or like clothing.

What I claim as my invention and desire to secure by Letters Patent is:

1. Air conditioning apparatus for aircraft having at least one propulsion engine comprising a source of hot compressed air, an air turbine the inlet of which is connected to the source of compressed air, means delivering the air from the turbine outlet to a compartment of the aircraft, fuel supply apparatus for delivering fuel to the propulsion engine, including at least one tank forming a fuel reservoir and a fuel circulating system including said tank and a pump driven by said turbine and arranged to circulate fuel continuously through said circulating system, and a heat exchanger one section of which is arranged between the source of compressed air and the air turbine, while the other section is arranged in the fuel circulating system, so that heat is transferred in said heat exchanger directly from the compressed air to the fuel in the circulating system before the compressed air passes through the turbine.

2. Air conditioning apparatus as claimed in claim 1 in which the turbine includes variable delivery nozzle means whereby the speed of the turbine and the temperature drop therein and hence the transfer of energy to the fuel by the pump can be controlled and including thermostatic means arranged to be responsive to the temperature of the conditioning air in the compartment and apparatus arranged to control the variable delivery nozzle means of the turbine and controlled by said thermostatic means.

3. Air conditioning apparatus for aircraft as claimed in claim 1 including in the fuel circulating system means for controlling the circulation in a manner tending to maintain the fuel delivered to the engine within a predetermined temperature range.

4. Air conditioning apparatus for aircraft as claimed in claim 3 including means for varying the characteristics of the turbine and hence the work done by and the temperature drop in the turbine to vary the relationship between the temperature rise in the pump and the temperature drop in the turbine.

5. Air conditioning apparatus for aircraft having at least one propulsion engine comprising a source of hot compressed air, a heat exchanger, a fuel tank, a pump, an air turbine arranged to drive the pump, a first air delivery passage between the source of compressed air and one section of the heat exchanger, a second air delivery passage between said section of the heat exchanger and the turbine inlet, a third air delivery passage between the turbine outlet and a point at which conditioned air is required, a first fuel passage between the tank and the other section of the heat exchanger, a second fuel passage between said other section of the heat exchanger and the pump inlet, a control valve, a third fuel passage between the pump outlet and the control valve, a fourth fuel passage between the control valve and the fuel tank, a fifth fuel passage between the control valve and the engine, thermostatic means controlling the control valve to vary the proportion of fuel which flows respectively from the third fuel passage to the fourth fuel passage and from the fifth fuel passage to the fourth fuel passage, turbine control means, a thermostatic device subject to the temperature of the conditioned air and control means between the thermostatic device and the turbine control means.

References Cited in the file of this patent

UNITED STATES PATENTS

| 2,503,250 | Eckert | Apr. 11, 1950 |
| 2,658,331 | Johnson | Nov. 10, 1953 |

FOREIGN PATENTS

| 235,359 | Great Britain | June 18, 1925 |
| 689,844 | Great Britain | Apr. 8, 1953 |